(No Model.)
T. HANN & W. BROMLEY.
VELOCIPEDE OR OTHER VEHICLE.
No. 563,589. Patented July 7, 1896.
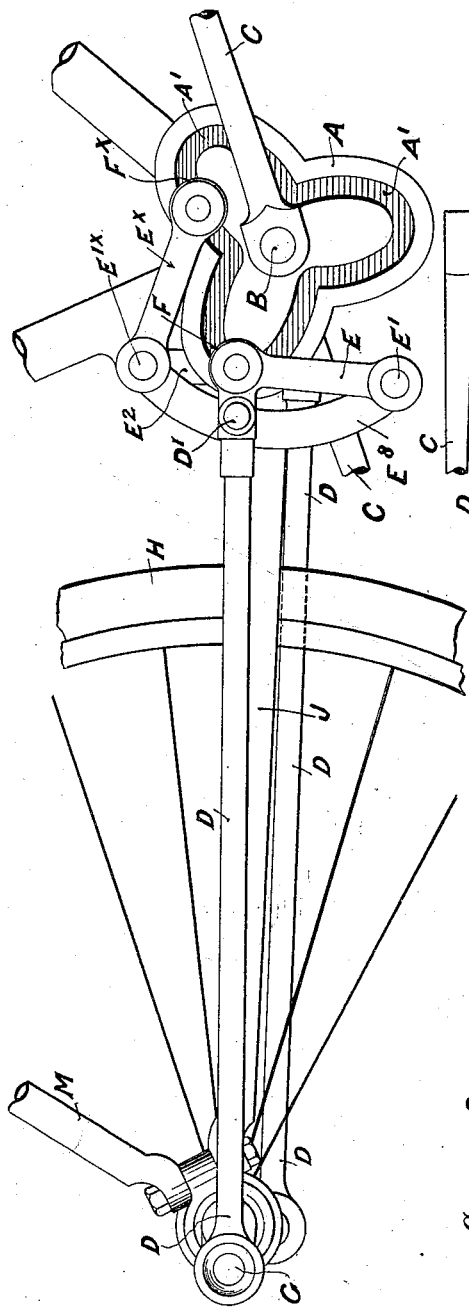
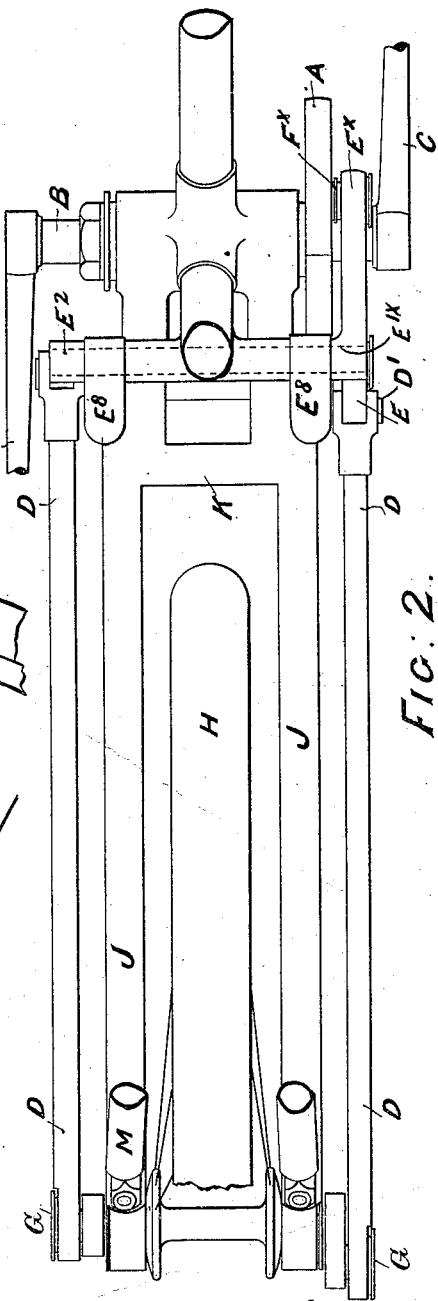
Witnesses
Chas H Smith
J. Staib
Inventors
Thomas Hann
William Bromley
per L. W. Serrell & Son
Attys
THE NORRIS PETERS CO., PHOTO-LITHO., WASHINGTON, D. C.

UNITED STATES PATENT OFFICE.

THOMAS HANN AND WILLIAM BROMLEY, OF LONDON, ENGLAND, ASSIGNORS TO JOHN PRICE, OF SAME PLACE.

VELOCIPEDE OR OTHER VEHICLE.

SPECIFICATION forming part of Letters Patent No. 563,589, dated July 7, 1896.

Application filed January 6, 1896. Serial No. 574,436. (No model.) Patented in England August 16, 1893, No. 15,558.

*To all whom it may concern:*

Be it known that we, THOMAS HANN, residing at Plumstead, in the county of Kent, and WILLIAM BROMLEY, residing at Upper Kennington-Lane, London, in the county of Surrey, England, subjects of the Queen of Great Britain, have invented certain new and useful Improvements in Velocipedes or other Vehicles, (for which a patent has been granted to us in Great Britain, bearing date the 16th day of August, 1893, No. 15,558,) of which the following is a specification.

Our invention will be readily understood by the following description, referring to the accompanying drawings, which show by way of example the invention applied to a rear-driven safety-bicycle.

Figure 1 is a side elevation of so much of the driving-gear as will be necessary to explain same when one cam is employed, and Fig. 2 is a plan view of the same.

A is the cam grooved at A' and shown as of trefoil configuration. The said cam A is fixed upon the pedal-axle or driving-shaft B. C are the cranks, which are provided with pedals, as usual, when applied to velocipedes, and by which the shaft B is rotated.

D are the connecting-rods, one being pivoted at D' to a rocking-arm E, carrying a roller F, located within the groove A' of the cam A, the rocking arm E being pivoted at E' upon one of the brackets or lugs E⁸, extending from the framework of the machine. The opposite connecting-rod D is operated by a rocking arm E×, having a roller F× located in the cam-groove A' and connected at E'× to a transverse rock-shaft, the opposite end of which latter carries an arm E², to the end of which the opposite connecting-rod D is pivoted.

The connecting-rods extend to the shaft of the driven wheel H, where they take onto the crank-pins G of cranks or disks fixed to or formed with the axle of the driven wheel H. The cranks of the driven wheel H are arranged so that the crank upon one side is at right angles to the crank upon the other side.

The pedal-axle B being rotated once, the driven wheel H will receive three revolutions by reason of the cam A being of three-throw character, but if the cam was but two-leaved it will be understood the driven wheel would be revolved but twice.

We do not limit ourselves to the particular arrangement of the machine as a whole. For instance, the driven wheel may be either a leading or rear wheel and the vehicle may have more than two wheels.

We claim as our invention—

In a velocipede or other vehicle the combination with the driving-shaft, of a driving-wheel and its shaft, crank-pins at right angles upon the shaft of the driving-wheel, connecting-rods from such crank-pins, a grooved cam having two or more projections and connected with the driving-shaft, two rollers in such groove, a link connection between one roller and one of the connecting-rods, a cross-shaft and arms at its ends, one of which carries one of the rollers in the cam-groove and the other is connected with the second connecting-rod, substantially as set forth.

THOMAS HANN.
WILLIAM BROMLEY.

Witnesses:
E. G. BREWER,
F. M. ROGERS.